No. 876,996. PATENTED JAN. 21, 1908.
G. W. PICKARD.
INTELLIGENCE INTERCOMMUNICATION BY MAGNETIC WAVE COMPONENTS.
APPLICATION FILED JUNE 10, 1907.

2 SHEETS—SHEET 1.

Attest:

Inventor:
Greenleaf Whittier Pickard
by Philip Farnsworth, Atty

No. 876,996. PATENTED JAN. 21, 1908.
G. W. PICKARD.
INTELLIGENCE INTERCOMMUNICATION BY MAGNETIC WAVE COMPONENTS.
APPLICATION FILED JUNE 10, 1907.
2 SHEETS—SHEET 2.

Attest:

Inventor:
Greenleaf Whittier Pickard
by
Philip Farnsworth Atty

UNITED STATES PATENT OFFICE.

GREENLEAF WHITTIER PICKARD, OF AMESBURY, MASSACHUSETTS.

INTELLIGENCE INTERCOMMUNICATION BY MAGNETIC-WAVE COMPONENTS.

No. 876,996.　　　　Specification of Letters Patent.　　　Patented Jan. 21, 1908.

Application filed June 10, 1907. Serial No. 378,057.

*To all whom it may concern:*

Be it known that I, GREENLEAF WHITTIER PICKARD, a citizen of the United States of America, and a resident of the town of Amesbury, State of Massachusetts, have invented certain Intelligence Intercommunication by Magnetic-Wave Components, the principles of which are set forth in the following specification and accompanying drawings, which disclose the forms of the invention which I now consider to be the best of the various forms in which its principles may be embodied.

This invention relates to means for effectively employing the magnetic component of electromagnetic waves for the commercial intercommunication of all kinds of intelligence by telegraphically or telephonically transmitted and received messages.

The object of the invention is to employ such magnetic component effectively for such transmission and reception of such intelligence, irrespective of the electric component heretofore employed, and whether or not such electric component be also employed.

Figure 1:
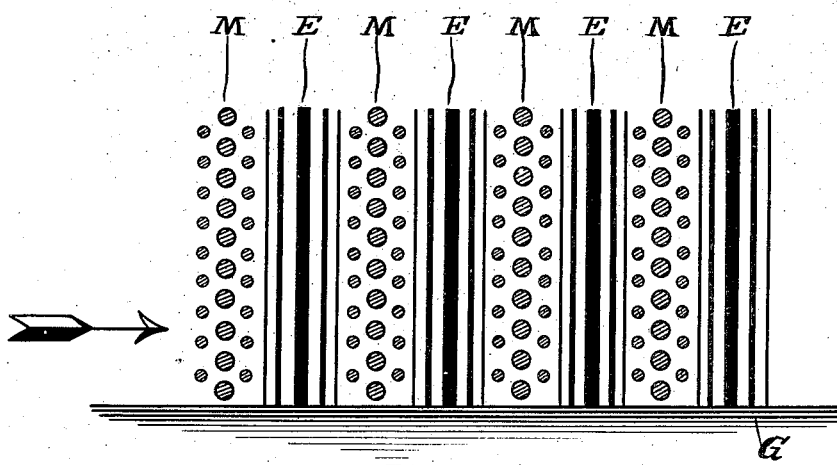

The invention consists and is embodied in electrical apparatus and conductors, suitably constructed, proportioned and combined, to accomplish the object of the invention, as fully described hereinafter in connection with the drawings, of which Figure 1 is an explanatory diagram, Fig. 2 a diagrammatic elevation of the invention, and Fig. 3 a similar elevation of a modification.

The invention also relates to means for coöperatively combining the means having the aforesaid objects and nature, with means for employing and utilizing the electric component of the specified waves. This means for operatively effecting this combination is shown diagrammatically in Fig. 3.

A consideration of the phenomena of electromagnetic waves, in connection with Fig. 1, will bring out the distinction, essential herein, between the electric and magnetic components of such waves. Fig. 1 is a part of a vertical section of the lower portion (*i. e.*, that in the vicinity of and above the earth's surface), of a train of electromagnetic waves, which passes in the direction indicated by the arrow, and which travels in all directions from a central source not shown. The section is taken along any radius of the widening circle of which the source is the center.

E, E represent the Faraday tubes, or electric components of the successive waves, which form parts of the train. M, M represent the magnetic components of the successive waves. The electric component of each wave is, in the vicinity of the earth G, normal to the surface thereof. The magnetic components M, M lag ninety degrees, or a quarter wave length, behind the electric components. The magnetic component M of each wave is shown as a plurality of vertical series of small circles or dots in cross-section, to illustrate the sections of the magnetic lines constituting closed circles parallel to the earth's surface, of widening diameters, around the source as a common center of these circles. The variations of degree of intensity of each individual component of either kind is roughly indicated by heavy and light lines in the case of the electric component, and by large and small circles or dots in the case of the magnetic component.

Heretofore in the practice of electric wave telegraphy and telephony, the magnetic component has been neglected, and has not been utilized to contribute to the operation to any effective degree, notwithstanding the fact that it possesses a substantial portion of the wave-energy; and heretofore the object has been to utilize the electric component exclusively. Judging from the remarkable results of the practical use of the invention hereof, the energy of the magnetic component is at least as great as that of the electric component. If any energy-robbing obstacle is encountered by a wave, which drains energy from either the magnetic warp or the electric woof of the wave, the rent is apparently repaired with energy automatically taken from the other component, so that the wave is self-repairing to establish a normally constant relation as to the energy possessed by each component. The methods which have been employed to utilize the electric component are substantially as follows. An elevated conductor or conductors are arranged so that they lie in the path of the waves, and have either a material connection to earth through a metallic conductor, or an operative connection across an effectively short space of the intervening air dielectric operating as a capacity connection, with which earth connection the detecting means is operatively associated. These elevated conductors, with their effective earth connection or connections, of either kind, have been termed "antenna", since they projected outwardly from the earth as originally used. When a train of eletcric waves passes such an antenna, certain of the lines corresponding to the electric components, terminate upon the antenna for an instant, and thereby raise or lower and vary its potential with respect to earth. This results, as a series of waves pass, in a number of up and down surges of current through the antenna and its effective connection to earth; the number of surgings corresponding to the number of waves in the series or train. The detector was directly or indirectly included in the path of these surgings and was operated thereby. Such antenna have been of various constructions, such as the open-ended or insulated type, and the closed-circuit type, and of various arrangements, such as projecting more or less vertically into the air, or lying horizontally with respect to the earth, either normal to or parallel with the radius of wave-propagation, or indifferently with respect thereto. In all cases however, the action is the same, as by the momentary termination on the antenna of a certain portion of the electric component, and the variation of the potential thereby in the antenna and earth connection, whether or not the antenna lies horizontally in line with the direction of the waves, and whether the earth connection be a metallic conductor or the intervening air dielectric or a condenser or equivalent capacity. In examples of such systems where the closed-circuit has included considerable area sufficient to capture a part of the energy of the magnetic component, the inclusion of the detector in an effective earth connection has prevented the practical utilization of that energy.

I have discovered, not only that the magnetic component can be usefully employed in commerce, but that it can be thus usefully employed exclusively of the use of the electric component, and that when so exclusively employed, much better results are obtained than by the old systems which employed the electric component alone. I have discovered that the magnetic component can be so alone used in commerce, by means of employing a closed circuit of such nature that the area inclosed within the circuit is of an order of magnitude of hundreds of square feet or sufficiently large to be cut by an extremely large number of the magnetic lines, shown as the circles M of Fig. 1. I have discovered that if such a closed circuit, inclosing an area of such an order of magnitude, at a receiving installation, include a condenser of capacity such as to cause the natural period of the circuit to be the same as the period of the source of waves, then the cutting of the area included within the circuit, by the extremely large correspondingly included number of lines of the magnetic components of the waves in a passing wave-train, will cause a resonant building up of current in the circuit, and an increase of potential across the condenser terminals, such as to be most efficient, and more effective than any previous system, in producing indications, by suitable local means, constituting complete and accurate telegraphic or telephonic messages. I have also discovered that if such a circuit, inclosing an area of such an order of magnitude, be used at a transmitting installation, with any efficient source of wave-producing oscillations, it will operate effectively as a means for transmitting an efficient amount of energy in the form of waves consisting chiefly of magnetic components, which will operate efficiently with a circuit at a distant receiving installation similarly constituted as to inclosing an extremely large area. I have further discovered that the operation of such a large-inclosing-area circuit is exclusive of any action of the electric lines. The chief essential of such a circuit is its large inclosed area, by which it incloses a large number of magnetic lines of the passing waves. I have further discovered that the strength of the received signals is approximately directly proportional to the inclosed area of the circuit, this fact being in accordance with the general physical law that the electromotive force set up by a magnetic flux through the plane of a closed circuit is directly proportional to the number of magnetic lines in such flux included within the circuit. I have further discovered that the syntonization of such a circuit can be perfectly effected, and should preferably be effected, without the use of tuning inductance, and solely by means of a variable condenser operating in the main circuit.

Figure 2:
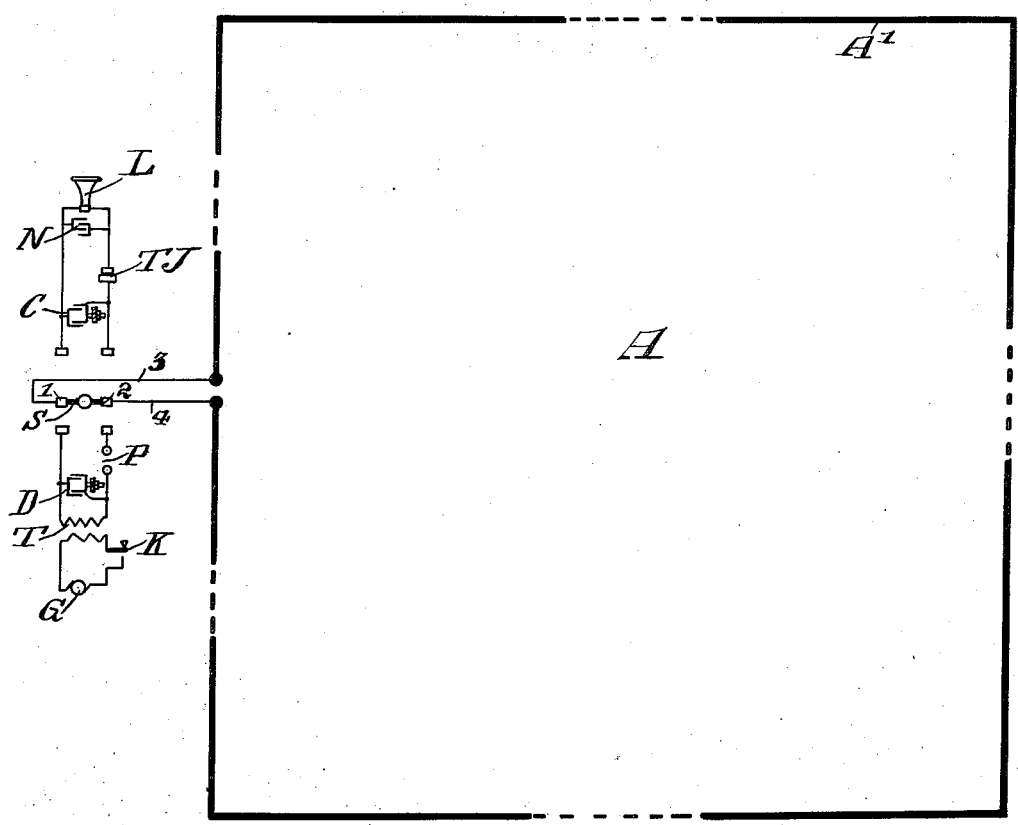

In Fig. 2, A represents the area inclosed by a circuit of number sixteen copper wire A', having minimum inductance. I have used such an area on a small scale, with surprisingly good results of a commercial character, when the area was as small as about nine hundred square feet. From a given commercial transmitting station, distant about ninety miles, this circuit permitted the reception of clear, distinct signals constituting complete telegraphic messages, the energy of which measured one one-hundredth of an erg per Morse dot. A circuit inclosing about five times said area, i. e., about four thousand and five hundred square feet, and of substantially the same capacity, but of irregular shape, permitted the reception of equally distinct signals and messages, but of greater intensity, the energy of which measured six one hundredths of an erg per Morse dot. (See an article by me entitled "Measurements of Received Energy at Wireless Stations", in the *Electrical Review*, December 15, 1906). This circuit, now in use with the station at Wellfleet, Massachusetts, has a measured inductance of one hundred and eighty seven microhenries, and a capacity of about five one-thousandths of a microfarad for tuning.

The dotted part of the wire A' in Fig. 2 indicate the fact that the inclosed area is enormously greater in proportion to the other parts of the figure. The shape of the circuit is unimportant, provided only that its inclosed area is of a degree sufficiently large to produce the novel result of commercial operativeness in respect of telegraphic and telephonic messages, by means of the magnetic component of the passing waves, exclusive of the electric component. The distance between the bottom of the circuit and ground is immaterial, because the operation of the detector is entirely by the currents magnetically set up in its including circuit, entirely independent of the action of the electric lines which is in turn dependent upon condenser action between the aerial conductor and earth. The circuit is preferably arranged, for best operation, so that the inclosed area is substantially or effectively normal or approximately normal to the horizontal planes of the magnetic circles, although the invention is operative with a considerable departure from this position. That is to say, the plane of the area of the inclosed circuit should preferably be vertical with respect to the earth's surface, in order that the magnetic lines near the earth (M of Fig. 1) may thread through the inclosed area, and not simply sweep across it, as would be the case if the inclosed area were absolutely parallel with the earth's surface and therefore parallel with the planes of the magnetic circles. When the plane of the area inclosed by the circuit is normal to the vertical plane of the magnetic lines, which in turn are normal to the radius of wave-propagation, it will be most effectively threaded by those magnetic lines.

I have found not only that the received energy increases in proportion to the area of the circuit independently of its capacity, but that the addition of a metallic earth connection to any point of the circuit, fails to produce the slightest observable effect upon the intensity or the tune of the received signals. Although this circuit will operate with tuning inductance, variable to effect syntonization, yet the intensity of the received energy decreases as the inductance is increased, such that the use of any inductance other than that of the circuit conductor A' itself is positively detrimental; and the natural inductance of the circuit itself should be as low as possible and be preferably limited to that of the wire itself. This holds true, with a variable inductance, whether the detector connection be direct, or through an oscillation transformer. Perfect tuning can be obtained by the small variable condenser C, with air dielectric, in the circuit of the detector, which is the main circuit A, the detector and condenser being shunt with each other, each being in series in the main circuit.

Of course, no circuit heretofore in use, in this or any other art, has been entirely free from the action of the magnetic components of electro-magnetic waves. But no circuit such as heretofore used in this art, employing no inclosed area at all or an area so small as to be ineffective for my purpose, or inclosing a large area but employing a detector connected in an earth connection, and including a tuning inductance, and wherein the electromotive force due to the magnetic component exists only between the top of the antenna and the inductance, and not between the inductance and ground, can possibly involve the effective contribution of the magnetic component to the end of producing intelligible signals. It is absolutely essential to the operativeness of this invention that the inclosed area of the aerial circuit be of the order of magnitude specified herein, although it may depart considerably from the dimensions specified herein, to conform with varying conditions. This means that a considerable length of conductor is necessary; and the resulting efficiency, over and above simple operativeness in transmitting and receiving intelligible messages over commercial distances, will depend largely upon the outlay on wire for the aerial circuit. No considerations of local convenience should be permitted to prevent an adequate inclosed area, as the practical operativeness of the invention for the transmission and reception of messages is dependent upon an adequate area, such as that specified herein.

The circuit of this invention, by being chiefly dependent for its operation on the great extent of its inclosed area, is thereby independent of height, and the area may be distributed over a height of a few feet and a distance of hundreds of feet. The main circuit of Fig. 2 may be and preferably is of little height in respect of the earth's surface. Since this circuit is operatively independent of any earth connection, and operates as well with it as without it, a low wire fence of considerable length, so as to include the necessary large area, provides a satisfactory circuit, provided that the parts of the circuit be properly insulated from each other so as to establish a closed circuit. This is particularly valuable because it is entirely immaterial to which part of the circuit the local transmitting or receiving apparatus be connected. So in time of war, the circuit may be strung rapidly on a long series of lances stuck into the ground, since it requires no high poles or masts; and this is particularly advantageous in that the circuit need not project upwardly, as above, surrounding trees, etc., so as to be within sight of the enemy. Furthermore, in employing the magnetic component in accordance with this invention, the action is apparently not interfered with to a material degree by intervening trees or other conducting bodies connected to earth, in the vicinity of the main circuit. It makes little difference however, whether the circuit be of considerable length, or whether it be low, provided only that the inclosed area be sufficiently large, in coöperation with the presence of sufficient capacity and the absence of too great inductance, to accomplish the object of the invention; and this comparative immateriality is due to the fact that the extremely large inclosed area is the operative and material thing. An additional characteristic of the action of this circuit by the magnetic component, is the fact that it is totally inoperative by the magnetic component when the plane of the inclosed area is absolutely parallel with the vertical plane of the magnetic lines, and for the same reason, broadly, that it is not efficiently operative when the plane of its inclosed area is absolutely parallel with the horizontal plane of the magnetic circles, i. e., because the area is not then efficiently threaded by the magnetic lines. In the former case, the lines cut the area, but the magnetic force acts in different directions in the circuit at the same time, thus preventing an effective resultant current. In the latter case there is no threading at all of the magnetic lines through the circuit. It has heretofore been observed, in the case of circuits, either open, or closed to include a small area, which circuits were used either with a metallic or dielectric connection to earth to be operated as localizers or range finders by the electric component, and not as installations for the intercommunication of intelligible telegraphic and telephonic messages by means of the magnetic component, that there would be a mere variation in results between the positions of the circuit when normal to and when parallel with the radius of wave propagation. In the present case however, the difference is not a mere difference of variation in degree of operativeness, but the difference is between commercial operation for the intercommunication of intelligible telegraphic and telephonic messages, due to the exclusive action of the magnetic component on a large scale measured by the large inclosed area of the circuit, on the one hand, and on the other the result of total inoperativeness when the inclosed area is precisely normal to the radius of wave propagation. This difference is so marked that it serves very usefully as a means for the practical elimination of interference by foreign messages transmitted along a radius approximately normal to the plane of the inclosed area of the circuit of this invention. As in circuits employing the electric components, the circuit hereof should have an electrical length not in excess of a quarter wave length, so that reversals of direction of the magnetic lines and consequent algebraic addition of positive and negative electromotive force will not reduce the effective energy. In the case of this invention however, the length of the circuit to be considered is the horizontal length with respect to the earth's surface, and not the vertical length. But mere length is ineffective in this invention if not accompanied by the necessary high order of area inclosed by the closed circuit. In the case referred to herein, as the smaller of the two areas used, the circuit was about ninety feet long and ten feet high, it being absolutely necessary to separate the upper and lower wires a considerable distance from each other in order to obtain the required area without exceeding the limitation of efficient length. Without this sufficient area the circuit will not be operative for its purpose as a means for the intercommunication of intelligible messages in commercial telegraphy or telephony by means of the magnetic component.

In Fig. 2, the local receiving apparatus is shown above the switch S at the left, and the local transmitting apparatus below the switch S. Any suitable double-pole double-throw switch (S) may be connected to the terminals 1, 2 of the leads 3, 4 to the terminals of the main or aerial part of the circuit A. This switch S may be thrown downwardly to connect the local transmitting apparatus to the main part of the circuit, or upwardly, to disconnect the latter and connect in the local receiving apparatus. The local transmitting apparatus may be of any suitable character, except that a suitable condenser, forming a part thereof, will be included in the main circuit A. As shown, the transmitting apparatus comprises an alternating current generator G, a transformer T, a sending key K, a condenser D, and a spark-gap P. The local receiving apparatus, as shown, consists of a small variable condenser C, with air dielectric, for tuning the main circuit A to the frequency of the passing waves; any suitable current-operated oscillation detector T J, such as that of my Patent 836,531 of November 20, 1906; a small condenser N, of fixed value, and with mica dielectric, as a shunt to the telephone; and a pair of ordinary head telephones represented at L; all connected as shown. If desired, any suitable amplifying relay may be coöperatively associated with the detector T J, as known in the art. The condenser C serves not only as a means for causing a resonant building up of current in the circuit, due to the action therein of the magnetic lines inclosed thereby; and as a means for tuning; but also as a means for preventing the short-circuiting of the detector and telephone. As stated, either the local transmitting or the local receiving apparatus, or both, may be connected to any convenient part of the main circuit, and this is because the action is entirely independent of the action of electric lines. The condenser C of the local receiving apparatus, which is included in the circuit A' when the latter is used for receiving, acts to syntonize the period of the circuit A' with the frequency of the passing waves, so as to permit a resonant building up of current in the circuit A' when a wave-train passes, due to the action of the magnetic components of the successive waves of the train upon the circuit A', inclosing an area of the required order of magnitude.

Owing to the absence of any artificial inductance in the circuit, and its extremely conservative character as a closed circuit, the oscillations are very persistent and the tuning very sharp indeed, so that a maximum of the energy of the magnetic components of passing waves is available for use in the indicating device L when efficiently transformed into, or otherwise made available in direct current form, by means of the detector T J. Irrespective of efficiency of operation, this invention is advantageous in its simplicity. Thus, in the absence of tuning inductances, high masts or poles, etc., the receiving system of Fig. 2, constituting an efficient and perfectly syntonizable system, consists simply of the wire A' (which need not be provided with expensive or any insulation), and of the four single devices C, T J, N and L. An additional advantage of this invention is its total freedom from interference by foreign electrical disturbances in the atmosphere, known as "static". In its simple form, independent of the action of the electric component, it is absolutely immaterial whether or not an earth connection of any kind be used. When entirely insulated from earth, the circuit as a whole will be normally charged to the potential of the surrounding air, and all static discharges through the circuit and the detector would be prevented.

An important feature of this invention in its use in a transmitting system, is its ability to transmit the energy substantially in line with the plane of the closed circuit, in analogy to the receiving properties of the invention.

Figure 3:
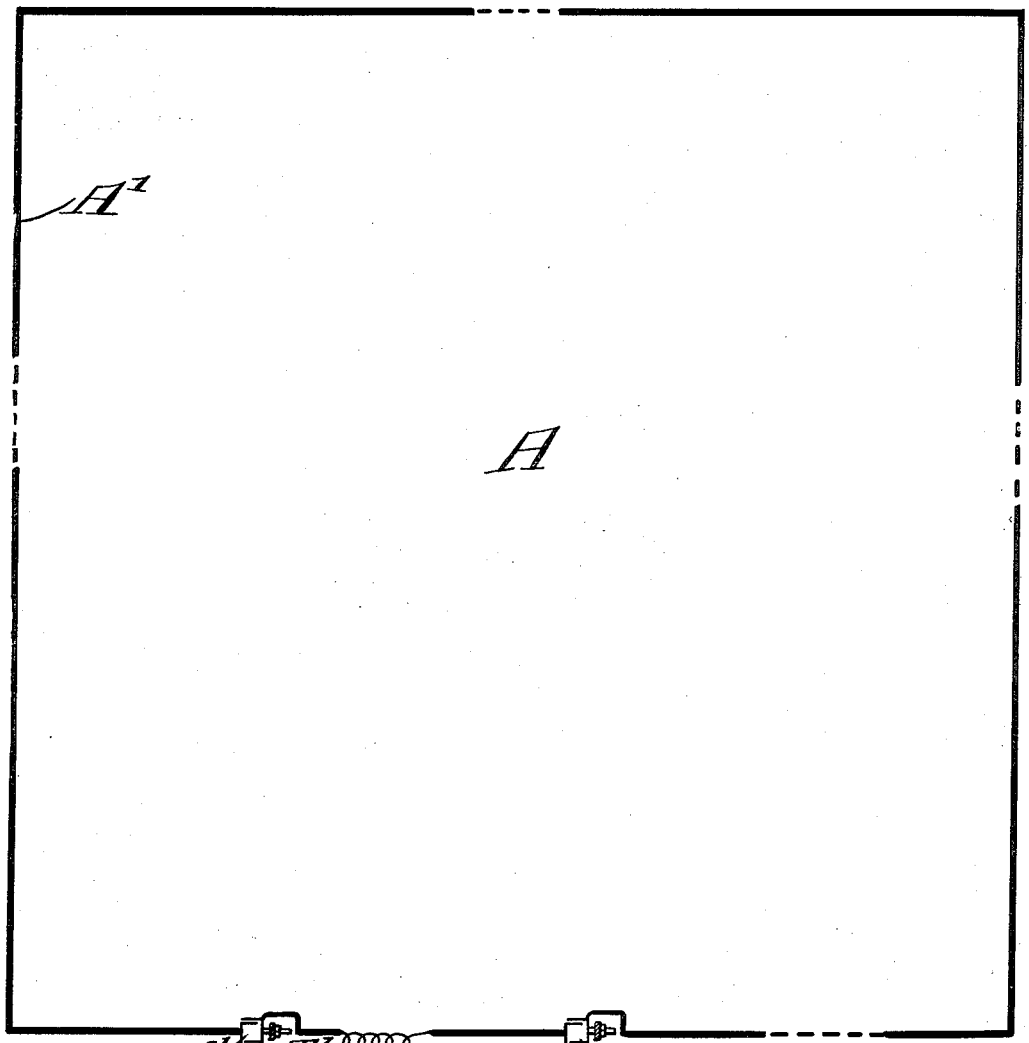
Figure 3:
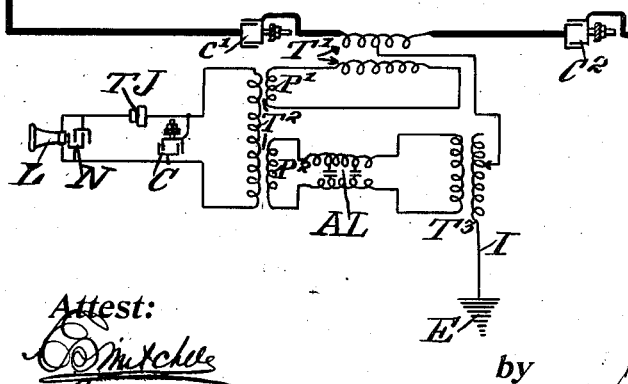

In Fig. 3, both the magnetic and electric components are employed, thus greatly raising the efficiency in cases where the circuit is of sufficient height or length to operate economically with respect to the electric component, and when the enclosed area is sufficiently large, in any shape, to operate economically with respect to the magnetic component and so as to compensate for the relative inefficiency of the magnetic component due to the inclusion of the various inductances. The aerial circuit A' includes the variable condensers $C^1$ and $C^2$ (for the same purpose as that of C in Fig. 2), and one member of the transformer T'. This transformer operates by the current set up in the circuit A' by the magnetic lines included within its large area, and this transformer T' supplies the primary P' of the transformer $T^2$ to which the local receiving apparatus is connected as shown at the left; the detector T J being adapted to be included in the circuit A' in the path of the currents set up by the magnetic component, and being independent of the earth connection for the electric component. Substantially all the captured energy of the magnetic component is conveyed to the primary P', and none of this energy passes through the earth connection I. The transformer T' is substantially non-inductive to the surgings of the currents caused by the momentary termination on the wire A', of the electric components of the passing waves; and the two halves of the upper member of the transformer T' act as simple leads to the earth connection I, from a member of the transformer $T^3$, which member may be adjustable, for tuning with respect to the electric component, as shown by the arrow connection. Substantially all of the captured energy of the electric component is conveyed through the earth connection I and none of it reaches the primary P'. The currents in this transformer $T^3$, being due to the action of the electric component, are ninety degrees in advance of those in the primary P' of transformer $T^2$, owing to the fact that the magnetic components of the waves, which produce the currents in the primary P', lag by this amount behind the electric components. This applies to currents caused by a given wave-train, constituting an individual telegraphic signal, or to a continuous train of waves which is interrupted to produce a telegraphic signal, or varied to transmit a telephonic message. These currents therefore, being out of phase, may not be readily combined directly to produce an intelligible result in the local receiving apparatus. By connecting a short artificial line in circuit with either set of currents, which line is equal to ninety degrees in electrical length, a retardation can be effected to bring the two sets of currents into phase with each other; as by the artificial line A L between the transformer $T^3$ and the primary $P^2$ of the transformer $T^2$. Thus the two sets of currents can be added together in the transformer $T^2$ to coöperate in acting most advantageously upon the local receiving apparatus. The metallic connection I need not of course extend below the transformer $T^3$, because the action by the electric lines can effectively take place provided there is sufficient height or length of the aerial circuit, and an operative earth connection as by a sufficiently short distance of intervening air dielectric. By reason of the artificial line A L and its associated apparatus, the current-operated detector T J is indirectly but effectively connected to the earth connection I, approximately at a current node, so as to be acted upon by the effect of the electric component made available by the earth connection. The design of the earth connection I and its aerial, whereby it is effective in obtaining in available form the energy of the electric component, differs in no way from the prior art. In Fig. 3, the systems of the art are modified in accordance with the principles of this invention as shown in Fig. 2, in order to obtain the energy of the magnetic component in available form; and in Fig. 3 is the means for putting the two sets of currents in phase and utilizing them to operate a common local receiving set. In using the circuit of Fig. 3 as a transmitting installation, the local transmitting apparatus shown in Fig. 2 may be connected to the aerial A' of Fig. 3 in the same way as in Fig. 2.

The combination system of Fig. 3 is no more complicated than many of the systems heretofore employing the electric component alone and using the customary tuning inductances, transformers, ground connections and condensers; and in installations where it is necessary to utilize all of the energy in the passing waves, including that of both the magnetic and electric components, it is indispensable. The simple system of Fig. 2 herein is amply efficient for all usual conditions and ordinary installations, and its simplicity and increased efficiency as compared with previous systems, make it an extremely desirable equipment for commercial use. It is particularly well adapted for use on ships on the high seas, in respect of its ability to furnish maximum efficiency of communication between a ship and head on obstructions or other ships equipped with similar or different systems.

The advantages of this invention may be briefly recapitulated as follows. No high poles, masts, towers or other elevated structures are required, so that the cost of installation is slight, and great variation in mode of installation is permitted, to conform with local conditions. Furthermore, since earth connections from any points on the circuit do not affect the operation in any way, as distinguished from all methods of employing the electric component, the necessity of any expensive means of insulation is obviated. The expense of providing tuning inductances is also obviated, because the invention is more efficient without any such inductances, as distinguished from methods employing the electric component. There is no material interference by neighboring conductors such as trees or other vegetation, as distinguished from systems employing the electric component. Interference by foreign stations can be cut down so as to be entirely obviated, as described. When the circuit of this invention is insulated from earth, there is absolutely no trouble from "static" discharges, which cannot be prevented in systems employing the electric component, without expensive special apparatus. The system of this invention, comprising a closed circuit, in order to obtain the necessary operative area, is thereby conservative of energy, and permits sharp tuning. The invention also provides means, in proper coöperation with means for employing the electric component, for utilizing effectively, absolutely all of the energy employed in intercommunication. Considered as a whole, the invention is distinguished from prior commercial systems by its extreme simplicity, and in the last analysis is, so far as its closed circuit character is concerned, and except as to proportions, similar to the little ring or resonator of Hertz, but used with the coöperating apparatus and in the proportions and positions specified herein as proper and necessary to secure practical results. When Hertz discovered that he could connect points of his little ring to earth, through the gas-pipe in his laboratory, without disturbing the oscillating action, and reached the conclusion that these points were the potential nodes, of a circuit acted upon by the surgings set up by the electric lines, it may be that he used the ring in such way, (without recognizing the fact,) as to obtain results by the magnetic lines, such that earth connections could have been made without effect from all points of the circuit. In this invention however, it is certain that there are no current nodes or potential anti-nodes, as in all systems using the electric component, because any or all points of the circuit can be connected to earth without producing the slightest observable effect on the intensity or the tune of the received signals, and because the local apparatus can be connected to the main circuit at any desired or convenient place.

The marked characteristics of this invention are its extreme simplicity, combined with its practical efficiency in commercial work.

I claim:

1. Means for employing the magnetic components of electromagnetic waves for the reception of telegraphically or telephonically transmitted messages and signals, which comprises a closed electrical circuit inclosing an extremely large area, to include an extremely large number of the magnetic lines of passing waves; said circuit including a condenser to cause a resonant building up of current in the circuit, due to the action thereon of said magnetic lines, the capacity of said condenser being variable to permit the syntonization of the circuit to the frequency of the transmitted passing waves; said circuit including also a current-operated detector; said condenser and detector being in shunt with respect to each other and connected in said circuit at any desired or convenient part thereof; a telephonic indicating device operatively associated with said condenser and detector, and a second condenser connected in shunt to the telephonic indicating device.

2. Means for employing the magnetic components of electromagnetic waves for the reception of telegraphically or telephonically transmitted messages and signals, which comprises a closed electrical circuit inclosing an extremely large area, to include an extremely large number of the magnetic lines of passing waves; said circuit including a condenser to cause a resonant building up of current in the circuit, due to the action thereon of said magnetic lines, the capacity of said condenser being variable to permit the syntonization of the circuit to the frequency of the transmitted passing waves; said circuit including also a current-operated detector; said condenser and detector being in shunt with respect to each other and connected in said circuit at any desired or convenient part thereof; an indicating device operatively associated with said condenser and detector, and a second condenser connected in shunt to the indicating device.

3. Means for employing the magnetic components of electromagnetic waves for the reception of telegraphically or telephonically transmitted messages and signals, which comprises a closed electrical circuit inclosing an extremely large area, to include an extremely large number of the magnetic lines of passing waves; said circuit including a condenser to cause a resonant building up of current in the circuit, due to the action thereon of said magnetic lines, the capacity of said condenser being variable to permit the syntonization of the circuit to the frequency of the transmitted passing waves; said circuit including also a current operated detector; said condenser and detector being in shunt with respect to each other and connected in said circuit at any desired or convenient part thereof; and an indicating device operatively associated with said condenser and detector.

4. Means for employing the magnetic components of electromagnetic waves for the reception of telegraphically or telephonically transmitted messages and signals, which comprises a closed electrical circuit inclosing an extremely large area, to include an extremely large number of the magnetic lines of passing waves; said circuit including a condenser to cause a resonant building up of current in the circuit, due to the action thereon of said magnetic lines, the capacity of said condenser being variable to permit the syntonization of the circuit to the frequency of the transmitted passing waves; said circuit including also a current-operated detector; said condenser and detector being in shunt with respect to each other and connected in said circuit at any desired or convenient part thereof.

5. Means for employing the magnetic components of electromagnetic waves for the reception of telegraphically or telephonically transmitted messages and signals, which comprises a closed electrical circuit inclosing an extremely large area, said circuit including a condenser to cause a resonant building up of current in the circuit, due to the action thereon of said magnetic lines, the capacity of said condenser being variable to permit the syntonization of the circuit to the frequency of transmitted passing waves; said closed circuit being adapted to become increasingly effective as its inclosed area approaches a position effectively normal to the horizontal plane of the magnetic lines of passing waves, to operatively include an extremely large number of said lines.

6. Means for employing the magnetic components of electromagnetic waves for the reception of telegraphically or telephonically transmitted messages, which comprises a closed electric circuit inclosing an extremely large area, to include an extremely large number of the magnetic lines of passing waves, said circuit having sufficient capacity to cause a resonant building up of current in the circuit, due to the action thereon of said magnetic lines which are included within the circuit; and a current-operated detector included at any desired or convenient part of said circuit.

7. Means for employing the magnetic components of electromagnetic waves for the reception of telegraphically or telephonically transmitted messages and signals, which comprises a closed electrical circuit inclosing an extremely large area, said circuit being adapted to become increasingly effective as its inclosed area approximates a position effectively normal to the horizontal plane of the magnetic lines of passing waves, and said circuit having sufficient capacity to cause a resonant building up of current in the circuit, due to the action thereon of said magnetic lines which are included within the circuit.

8. Means for employing the magnetic components of electromagnetic waves for the intercommunication of telegraphically or telephonically transmitted and received messages and signals, which comprises a closed electrical circuit inclosing an extremely large area, and arranged, in its position of maximum operativeness, to cause the inclosed area to lie substantially normal to a plane which is effectively parallel with the earth's surface at the place of installation, to include an extremely large number of the magnetic lines of passing waves.

9. Means for employing the magnetic components of electromagnetic waves effectively, irrespective of the electric component, for the intercommunication of telegraphically or telephonically transmitted and received messages and signals, which comprises a closed electrical circuit, of little height with respect to the earth's surface, but inclosing an extremely large area, and adapted to become increasingly effective as its inclosed area approximates a position effectively normal to the horizontal plane of the magnetic lines of passing waves to include an extremely large number of said magnetic lines.

10. Means for employing the magnetic components of electromagnetic waves effectively, irrespective of the electric component, for the intercommunication of telegraphically or telephonically transmitted and received messages and signals, which comprises an electrical conductor of low inductance connected to form a closed circuit, but inclosing an extremely large area to include an extremely large number of the magnetic lines of passing waves, the inductance of said circuit being limited to the inductance of said conductor itself, and said closed circuit being adapted to become increasingly effective as its inclosed area approximates a position effectively normal to the horizontal plane of the magnetic lines.

11. Means for employing the magnetic components of electromagnetic waves for the intercommunication of telegraphically or telephonically transmitted and received messages and signals, which comprises a closed electrical circuit inclosing an extremely large area to include an extremely large number of the magnetic lines of passing waves, and said closed circuit being adapted to become increasingly effective as its inclosed area approximates a position effectively normal to the horizontal plane of the magnetic lines.

12. Means for employing both the magnetic and electric components of electromagnetic waves for the intercommunication of telegraphically or telephonically transmitted and received messages and signals, which comprises a closed aerial circuit inclosing an extremely large area to include an extremely large number of the magnetic lines of passing waves; said aerial circuit having sufficient height to be effectively acted upon by the electric component; in combination with an effective earth connection to permit the effective action of the electric component; means for bringing into phase both sets of currents produced by the respective components; and a common receiving apparatus supplied with both sets of currents in phase.

13. Means for employing the magnetic components of electromagnetic waves for the intercommunication of telegraphically or telephonically transmitted and received messages and signals, which comprises a closed electrical circuit inclosing an extremely large area, and arranged, in its position of maximum operativeness, to cause the inclosed area to lie effectively normal to the horizontal plane of the magnetic lines at the place of installation, and in a plane which is effectively normal to the vertical plane of the magnetic lines.

14. Means for employing the magnetic components of electromagnetic waves for the intercommunication of telegraphic or telephonic signals and messages, which comprises a closed electrical circuit inclosing an extremely large area, said circuit being adapted to be increasingly effective in receiving the energy of the magnetic component as its inclosed area approximates a position normal to the plane of the circular magnetic lines so as to thereby include a correspondingly larger number of the magnetic lines within the closed circuit.

GREENLEAF WHITTIER PICKARD.

Witnesses:
MYRA S. ROWELL,
EDWARD H. ROWELL.